H. CLIFFORD.
RESILIENT WHEEL.
APPLICATION FILED AUG. 1, 1913.
1,139,639.
Patented May 18, 1915.
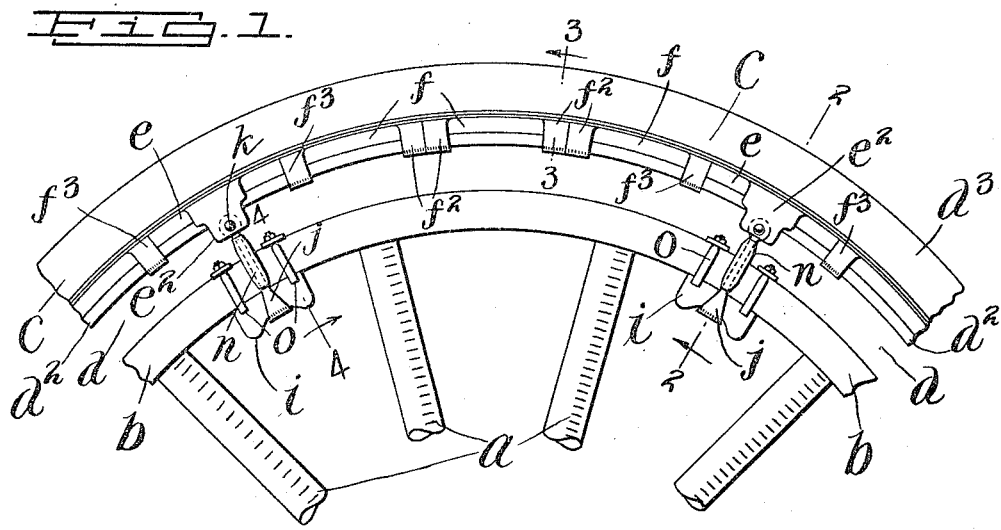
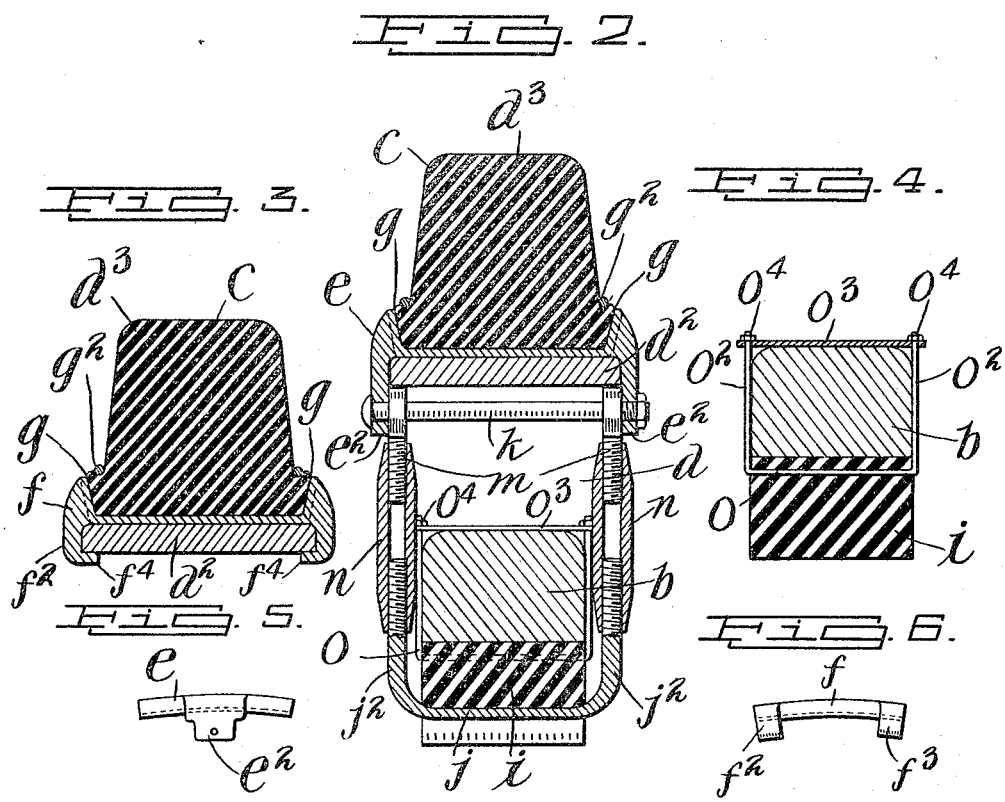
Inventor
Herbert Clifford,
By his Attorneys

UNITED STATES PATENT OFFICE.

HERBERT CLIFFORD, OF JERSEY CITY, NEW JERSEY.

RESILIENT WHEEL.

1,139,639.                    Specification of Letters Patent.        Patented May 18, 1915.

Application filed August 1, 1913.   Serial No. 782,422.

*To all whom it may concern:*

Be it known that I, HERBERT CLIFFORD, a citizen of the United States, and residing at Jersey City, in the county of Hudson and State of New Jersey, have invented certain new and useful Improvements in Resilient Wheels, of which the following is a specification, such as will enable those skilled in the art to which it appertains to make and use the same.

This invention is an improvement on that described and claimed in U. S. Letters Patent No. 1,066,799, granted to me July 8, 1913, and the object thereof is to improve and simplify the construction described and claimed in said patent, and to render the same more durable and efficient; and with this and other objects in view the invention consists in the construction, combination and arrangement of parts hereinafter described and claimed.

The invention is particularly applicable to the wheels of pleasure vehicles, such as automobiles, carriages and the like, but may be applied to the wheels of various kinds of vehicles; and said invention is fully disclosed in the following specification of which the accompanying drawing forms a part, in which the separate parts of my improvement are designated by suitable reference characters in each of the views, and in which;—

Figure 1 is a side view of a part of a wheel involving my invention; Fig. 2 a transverse section on the line 2—2 of Fig. 1; Fig. 3 a section on the line 3—3 of Fig. 1; Fig. 4 a section on the line 4—4 of Fig. 1, and Figs. 5 and 6 are side views of details of the construction of the tire of my improved wheel detached.

In the drawing forming part of this specification, I have shown at $a$, Fig. 1, a part of the spokes of a wheel involving my invention, a main rim member $b$ with which the spokes $a$ are connected in the usual or any desired manner, and a supplemental rim and tire member $c$ which incloses the main rim member $b$ and between which and said main rim member is an annular space $d$.

The main rim member $b$ may be made in any desired manner and of any preferred material, or a combination of materials, and the supplemental rim and tire member $c$ comprises an inner annular band $d^2$ of steel, or other suitable metal, and an outer tread member $d^3$ of rubber or other suitable material, and between the band $d^2$ and the tread member $d^3$ are placed tire saddles $e$ and $f$ which are of predetermined length and which fit closely on the band $d^3$ and which are of the same width as said band in cross section, and the tire saddles $e$ are provided centrally thereof with inwardly directed side ears $e^2$ which extend inwardly of the band $d^2$, and the tire saddles $f$ are provided with inwardly directed ears $f^2$ and $f^3$, and the ears $f^2$ are at abutting ends of the tire saddles $f$, in the form of construction shown, and the ears $f^3$ adjacent to the other ends and, in practice, the tire saddles $e$ and $f$ are so formed and placed as to cover the entire outer surface of the band $d^2$ so that the ends thereof abut, as shown, and the ears $f^2$ and $f^3$ of the tire saddles $f$ are clenched around the side edge portions of the band $d^2$, as clearly shown at $f^4$. The tire saddles $e$ and $f$ are also formed to receive the tread member $d^3$, as shown at $g$ in Figs. 2 and 3, and said tread member may be held in place by means of rings or bands $g^2$ in the usual or any preferred manner, or said tread member may be connected with and held on the tire saddles $e$ and $f$ in any preferred way.

Mounted on the inner side of the main inner rim member $b$ are rim saddles $i$ of rubber or any other suitable material, and said rim saddles $i$ are provided with transverse yokes $j$ having outwardly directed side members $j^2$ which are threaded, as shown in Fig. 2, and passed through the ears $e^2$ of the tire saddle member $e$ is a rod $k$ on which are mounted threaded bolts $m$, and the side members $j^2$ of the rim saddles $i$ are connected with the threaded bolts $m$ which are connected with the tire saddles $e$ by means of ordinary turn buckles $n$, and by turning said turn buckles in the desired direction, the main inner rim member $b$ and the supplemental outer rim and tire member $c$ may be securely connected, or bound together, as will be readily understood. The rim saddles $i$ are held in place on the main inner rim member $b$, in the construction shown, by yokes $o$ having side arms $o^2$ which extend outwardly across said rim member $b$, and on which are mounted transverse link plates $c^3$ held in place by nuts $o^4$, but said saddles may be connected with said rim member in any desired manner.

With this construction it will be seen that, as in my prior patent hereinbefore referred to, the weight of the vehicle will be suspended from the outer tire and rim member $c$ at all times and in all positions of the wheels of the vehicle, and the outer part of said outer rim and tire member $d^3$ being elastic and the rim saddles $i$ being also elastic, the body of the vehicle will be resiliently suspended, the annular space $d$ between the parts $b$ and $d^2$ permitting of a slight movement of the outer rim and tire member $c$ toward and from the main inner rim member $b$ at all times, and the outer rim and tire member will thus adjust itself to all road surfaces, and the movement and operation of a vehicle provided with my improved wheel or wheels may be effected with the least possible jolt or jar and inconvenience to the occupants thereof.

My invention is not limited to the exact form and construction of the tire saddles $e$ and $f$, or the method of connecting the tire saddles $f$ with the band $d^2$, nor to the exact method of securing the rim saddles $i$ to the rim member $b$, and various changes in and modifications of the various parts of the construction herein shown and described may be made, within the scope of the appended claims without departing from the spirit of my invention or sacrificing its advantages.

In the construction shown, the rim saddles $i$ are placed between alternate pairs of spokes $a$, and three of the tire saddles $f$ are placed between each pair of the tire saddles $e$, but this arrangement of said saddles may also be varied as may be desired or found necessary.

Having fully described my invention what I claim as new and desire to secure by Letters Patent is,—

1. A wheel provided with a main inner rim member and a supplemental outer rim member on which the tire is mounted, and which incloses but is separated from the main inner rim member by an annular space, said outer rim member being provided on its outer surface with transverse tire saddles which hold the tire in place, and some of which are secured to said rim member, and others of which are provided with inwardly directed ears, and the main inner rim member being also provided with elastic saddles which are secured on the inner side thereof, and on which are mounted transverse yoke members, the sides of which extend outwardly and are connected with said ears by turn buckle devices, whereby said elastic saddles may be put under greater or less compression.

2. In a wheel of the class described, a main inner rim member and a supplemental outer rim member which incloses, but is separated from the main inner rim member by an annular space, said outer rim member being provided on its outer surface with transverse tire saddles having inwardly directed ears, and the main inner rim member being also provided on the inner side thereof with elastic saddles which are secured thereto and on which are mounted yoke members the sides of which extend outwardly and are connected with said ears by turn buckle devices, involving transverse rods passed through said ears and through the outer members of the turn buckle devices.

3. A wheel provided with a main inner rim member and a supplemental outer rim member on which the tire is mounted, and which incloses, but is separated from, the main inner rim member by an annular space, said outer rim member being provided on its outer surface with transverse saddles which hold the tire in place, and some of which are provided with inwardly directed ears, and the main inner rim member being also provided on its inner surface with elastic saddles which are secured thereto, and on which are mounted transverse yoke members, the sides of which extend outwardly and are connected with the said tire saddle ears by radially adjustable devices.

In testimony that I claim the foregoing as my invention I have signed my name in presence of the subscribing witnesses this 26th day of July 1913.

HERBERT CLIFFORD.

Witnesses:
S. ANDREWS,
C. MULREANY.